Patented Dec. 28, 1926.

1,612,661

UNITED STATES PATENT OFFICE.

WILLIAM CHARLES SPROESSER, OF BLOOMFIELD, NEW JERSEY, ASSIGNOR TO WESTINGHOUSE LAMP COMPANY, A CORPORATION OF PENNSYLVANIA.

INTRODUCTION OF HYGROSCOPIC MATERIAL INTO EVACUATED DEVICES.

No Drawing. Application filed July 16, 1923. Serial No. 651,967.

This invention relates to the introduction of hygroscopic material into evacuated devices and more particularly to methods of efficiently introducing phosphorus pentoxide and the like into incandescent electric lamps.

An object of my invention is the introduction of a stable substance into an evacuated bulb, the substance being so prepared that it will not normally absorb moisture, but upon heating will generate a hygroscopic material, for example, phosphorus pentoxide, for the purpose of absorbing traces of moisture which may be left therein.

Another object of my invention is the introduction into an evacuated device, of a hygroscopic or moisture-absorbing material, in the form of a compound or mixture thereof with some other substance to form a product which normally will not absorb water, but which, upon heating therein will liberate or generate the required amount of moisture-absorbing material.

A further object is the introduction into incandescent electric lamps and the like, of phosphorus pentoxide or its equivalent, mixed or combined with some other material to render it non-hygroscopic, until heated in the lamp for the elimination of moisture therein.

A still further object of my invention is the employment of phosphorus pentoxide for eliminating moisture in incandescent electric lamps and other evacuated devices, by applying to the incandescible filament thereof, a product obtained by fusing the phosphorus compound with a material, such as cryolite or silica to render it non-hygroscopic until liberated by heat from the filament.

Other objects and advantages of the invention will be disclosed by the following description.

Moisture, as is well known, is very deleterious in incandescent electric lamps; for example, if the lamp includes an incandescent tungsten filament, moisture present in the bulb enclosing the filament will attack the same when heated, forming tungstic oxide and hydrogen. The tungstic oxide being volatile, will vaporize toward the bulb but upon cooling somewhat, will be reduced by the liberated hydrogen so that a deposit of metallic tungsten forms on the interior of the bulb causing blackening thereof as well as a weakening of the filament. It is therefore desirable to eliminate moisture to as great an extent as possible and one of the materials adapted for this purpose is phosphorus pentoxide ($P_2O_5$).

This material has a strong affinity for water to form phosphoric acid so that it cannot be exposed to air containing moisture without absorbing the same. Phosphorus pentoxide which has been largely transformed into phosphoric acid by absorbing moisture is obviously unsuitable for introducing into an evacuated device for the purpose of absorbing moisture therein. Up to the present time, it is believed that no commercially successful method has been devised for introducing moisture-free phosphorus pentoxide into an incandescent electric lamp or the like.

According to my invention, I combine phosphorus pentoxide or its equivalent with some material, preferably cryolite ($Na_3AlF_6$) or silica ($SiO_2$), to produce a substance which is non-hygroscopic but which, on heating, yields free phosphorus pentoxide for the purpose of absorbing moisture. Phosphorus pentoxide may be fused with cryolite or silica, for example, to form a white non-hygroscopic substance, which on heating yields free phosphorus pentoxide. It is believed that the use of such substance as a getter offers a means of improving lamp quality by virtue of the presence of phosphorus pentoxide evolved by the heating from the filament, which should remove any moisture initially present or liberated during burning, the presence of which, it is generally agreed, promotes blackening of the bulb.

Although cryolite or silica are preferred, it has been found that phosphorus pentoxide fuses with a great many compounds, particularly the halides, to form substances apparently valuable for eliminating moisture from evacuated devices.

My invention will better be understood by the following detailed description of a preferred means of practicing the same, using as examples, silica and cryolite for combining with phosphorus pentoxide.

The first experiments with phosphorus pentoxide products according to my invention, were made with a mixture prepared by fusing phosphorus pentoxide with silica. It was found that small amounts could be fused together in a good porcelain crucible by a careful and rapid manipulation. The phosphorus pentoxide and silica both in the form of fine powders are preferably thoroughly mixed by adding enough water to form a paste. The mixture may then be heated in a crucible, as before mentioned, gradually at first to remove most of the moisture and finally to about a bright red heat.

At elevated temperatures, phosphorus pentoxide is evolved and indicated by white fumes. This loss of phosphorus pentoxide may be considerably decreased by keeping the crucible covered. It is desirable to prepare the fusion mixture as quickly as possible because the lining of the crucible is attacked to an appreciable extent during the process of preparation.

Varying proportions of phosphorus pentoxide and silica may be used and it has been found that as high as 80% by weight of phosphorus pentoxide can be used in the initial mixture and yet obtain a final product which is non-hygroscopic. It is necessary to conduct the fusion at a very high temperature to insure complete reaction with the silica. It is desirable to use a larger proportion of phosphorus pentoxide in the initial mixture, than that desired in the final product, because of the vaporization thereof during the fusing process. After complete fusion, the product may be allowed to cool, removed from the crucible, powdered and gettered on or applied to filamentary material in the form of a suspension, as is customary in gettering operations.

The value of such a mixture as a getter and moisture absorbing agent was determined in 40 watt lamps as compared with the usual phosphorus-cryolite getter, which contains 100 parts, by weight, of cryolite and 13 parts, by weight, of phosphorus.

It was found that an improvement could be effected in both the manufacturing and standard specification life. The bump-test strength after flashing, of a filament treated with such a product is found to be increased from 25% to 100%.

Phosphorus pentoxide may also be fused with cryolite to obtain a similar getter material which, for some purposes, is more desirable than the phosphorus pentoxide silica getter. Various proportions of the ingredients may be used and the product is prepared with no great difficulty. For instance, equal parts of phosphorus pentoxide and cryolite result in a mixture or compound which is molten at about 450° C. and at room temperatures is a transparent colorless substance, insoluble and non-hygroscopic. The mixture when molten, reacts slowly with a clay crucible but if the fusion mixture is rapidly made, the final product contains only a small proportion of impurities. During the fusion process, phosphorus pentoxide is evolved in appreciable amounts as in making the silica mixture.

It is interesting to note that as the proportion of cryolite varies from 50% in either direction, the melting point of the fusion product increases and the final product loses its transparency until finally it is opaque. Mixtures have been prepared with the phosphorus pentoxide content varying from 35% to 65% and all were found to be non-hygroscopic.

In preparing the mixture, in some instances, considerable frothing occurred during the fusion process, probably on account of the evolution of water vapor. This frothing slowly decreases, but in some cases it was impossible to continue heating until the frothing had stopped, as the molten mass would dissolve too much of the crucible material.

The getter value of such mixture in comparison with the standard phosphorus-cryolite getter was determined both in 40 and 60 watt lamps and, generally speaking, the use thereof improved lamp quality. In general, an improved life and lumen maintenance resulted and an increase in bump-test strength after flashing of the filament of from 25% to 100%, as in the former instance.

Although the phosphorus pentoxide fusion mixture is preferably cooled, powdered and applied to filament material as a suspension, in the same manner in which phosphorus-cryolite or other getter is applied, other methods of application may be employed, provided means are found for supplying sufficient heat to the mixture, when in place, to cause a liberation of phosphorus pentoxide therefrom, as the active moisture-absorbing ingredient. If cryolite is used with phosphorus pentoxide, upon heating the mixture, it will serve as a candle-power maintenance ingredient by minimizing the light obscuring effect of the vaporized filamentary material, as is well understood.

Although only silica and cryolite have been mentioned as materials to be fused with phosphorus pentoxide for producing getters according to my invention, it is to be understood that other materials, particularly halides, may be used if the resulting fusion product is non-hygroscopic and decomposable at high temperatures to liberate phosphorus pentoxide therefrom.

Although phosphorus pentoxide has been mentioned as the preferred moisture absorbing substance, other hygroscopic materials may be substituted therefor, and the method disclosed for introducing phosphorus pentoxide may be modified for introducing such other materials, without departing from the spirit and scope of my invention, as defined by the appended claims.

What is claimed is:

1. The method of introducing phosphorus pentoxide into an evacuated vessel comprising mixing with another material and fusing to form a product which is non-hygroscopic, cooling and powdering the product, introducing the same into the vessel and heating to cause a liberation of phosphorus pentoxide therein.

2. The method of introducing phosphorus pentoxide into a device to be evacuated comprising mixing cryolite therewith, fusing the mixture, cooling and powdering the resulting product and applying it to an element in the device and heating to decompose the product with the liberation of free phosphorus pentoxide.

3. The method of introducing phosphorus pentoxide into a device adapted to be evacuated comprising mixing a suitable material therewith and fusing to form a non-hygroscopic mixture, cooling and powdering the resulting product and applying it to an element in the device and heating to decompose the product with the liberation of free phosphorus pentoxide.

4. The method of introducing phosphorus pentoxide into an incandescent electric lamp comprising mixing the same with another material and fusing the mixture to form a non-hygroscopic product, applying some of said product to a component part in the lamp and heating to decompose the product with the liberation of free phosphorus pentoxide to clean up moisture in the lamp.

5. The method of introducing phosphorus pentoxide into an incandescent electric lamp comprising an evacuated envelope enclosing a suitably-supported incandescible filament comprising mixing phosphorus pentoxide with cryolite, fusing the mixture, cooling and applying as a suspension to the incandescible filament, introducing the filament into the envelope, exhausting the envelope and energizing the filament to decompose the material thereon and liberate free phosphorus pentoxide for cleaning up moisture therein.

6. The method of introducing phosphorus pentoxide free from moisture into an incandescent electric lamp or the like including a bulb adapted to be evacuated and an incandescible filament suitably supported, comprising mixing phosphorus pentoxide with about the same amount by weight of cryolite, fusing the mixture, cooling, powdering, forming a suspension thereof and applying it to the filament, sealing the filament into the bulb, evacuating the bulb and heating the filament to decompose the material thereon, liberate phosphorus pentoxide and eliminate moisture in the bulb.

7. The method of eliminating moisture from the interior of incandescent electric lamps and the like including a bulb to be evacuated and an incandescible suitably supported filament comprising fusing a mixture of phosphorus pentoxide and cryolite to form a colorless, clear, non-hygroscopic product, preparing a suspension of the product and applying it to the filament as a coating thereon, sealing the filament into the bulb, evacuating the bulb and flashing the filament to decompose the product thereon, clean-up moisture by means of the phosphorus pentoxide liberated and cause the cryolite to function as a candle-power maintenance material to reduce obscuration of the bulb.

8. A getter for evacuated devices comprising a combination of phosphorus pentoxide with another material to form a product which is non-hygroscopic, but which liberates phosphorus pentoxide on heating.

9. A getter comprising phosphorus pentoxide combined with a candle-power maintenance material which serves to prevent obscuration of the bulb when used in an incandescent lamp.

10. A getter comprising phosphorus pentoxide combined with cryolite.

11. A getter comprising phosphorus pentoxide fused with cryolite.

12. An electric lamp comprising a filament gettered with a non-hygroscopic product of phosphorus pentoxide which is decomposable on incandescence thereof.

In testimony whereof, I have hereunto subscribed my name this 13th day of July 1923.

WILLIAM CHARLES SPROESSER.